United States Patent [19]

Hsieh et al.

[11] Patent Number: 5,006,506

[45] Date of Patent: Apr. 9, 1991

[54] MODIFIED CHROMIUM-CONTAINING CATALYST COMPOSITION FOR POLYMERIZING OLEFINS AND METHOD OF PREPARING THE CATALYST COMPOSITION

[75] Inventors: John T. T. Hsieh, Warren; Ann L. Pruden, Bellemead, both of N.J.

[73] Assignee: Mobil Oil Corporation, Fairfax, Va.

[21] Appl. No.: 454,538

[22] Filed: Dec. 21, 1989

[51] Int. Cl.$^5$ .................. B01J 21/02; B01J 21/06; B01J 21/08; B01J 23/26

[52] U.S. Cl. .................................... 502/204; 502/242; 502/309; 502/320

[58] Field of Search ................ 502/204, 242, 309, 320

[56] References Cited

U.S. PATENT DOCUMENTS

| | | | |
|---|---|---|---|
| 2,846,425 | 3/1958 | Hogan et al. | 260/93.7 |
| 2,984,653 | 5/1961 | Witt | 502/320 X |
| 3,351,623 | 11/1967 | Walker et al. | 260/94.5 |
| 3,715,321 | 2/1973 | Horvath | 252/441 |
| 3,960,826 | 6/1976 | Aboutboul et al. | 526/103 |
| 4,115,318 | 9/1978 | Speca | 252/428 |
| 4,146,695 | 3/1979 | van de Leemput | 526/105 |
| 4,345,055 | 8/1982 | Hawley | 502/242 X |
| 4,368,302 | 1/1983 | Downs | 526/105 |
| 4,374,234 | 2/1983 | Stricklen et al. | 526/105 |
| 4,801,572 | 1/1989 | Hsieh | 502/242 |
| 4,816,432 | 3/1989 | Hsieh | 502/107 |

*Primary Examiner*—W. J. Shine
*Attorney, Agent, or Firm*—Alexander J. McKillop; Charles J. Speciale; Marina V. Schneller

[57] ABSTRACT

A modified supported catalyst composition for polymerizing olefins, particularly alpha-olefins, for example, ethylene or ethylene and 1-hexene, is prepared by combining a chromium compound-containing catalyst with a modifier which is an oxide of an element of Group IIIA of the Periodic Table of the Elements. The modifier contains a small quantity of water. The resulting modified catalyst composition produces polymer resins having higher values of High Load Melt Index -HLMI ($I_{21}$) than catalyst compositions without the modifier.

There is also disclosed a process for polymerizing olefins, at relatively lower temperatures than was heretofore possible, to obtain resins of relatively high HLMI, using the above-identified modified catalyst composition. The resulting polymers can be used for the fabrication of blow-molded products, e.g., household and industrial containers.

40 Claims, No Drawings

MODIFIED CHROMIUM-CONTAINING CATALYST COMPOSITION FOR POLYMERIZING OLEFINS AND METHOD OF PREPARING THE CATALYST COMPOSITION

FIELD OF THE INVENTION

The present invention is directed to a chromium compound-containing catalyst for polymerizing alpha-olefins, also known as alpha-olefin, to a method for producing such a catalyst and to a method of polymerizing such olefins. More particularly, the invention is directed to a method of producing resins which are homopolymers of ethylene or copolymers of ethylene and at least one $C_3$–$C_{10}$ alpha-olefin, which have relatively high values of high load melt index (HLMI).

DESCRIPTION OF THE PRIOR ART

Chromium compound-containing alpha-olefin polymerization catalysts, also known as Phillips catalysts, have been extensively described in the literature. They are formed by supporting chromium trioxide, or a compound calcinable thereto, on a refractory oxide support material, for example, silica, alumina, zirconia, thoria or silica-alumina, and heating the oxide support material in a non-reducing atmosphere, preferably an oxidizing atmosphere, to produce an active polymerization catalyst. The produced catalyst is used to polymerize alpha-olefin using the so-called "solution form" or "particle form" process. In the "solution form" process, the monomeric alpha-olefin, which is normally ethylene or a mixture of ethylene with up to about 40 wt. % of higher alpha-olefins, is contacted with a suspension of the catalyst in a liquid hydrocarbon which is a solvent for the polymer at the polymerization temperature employed. In the "particle form" process, the monomer alpha-olefin or a mixture of alpha-olefins is contacted with a suspension or a fluidized bed of the catalyst particles in a fluid medium under conditions such that the polymeric alpha-olefin forms as solid particles suspended in or fluidized in the fluid medium. The fluid medium can be, for example, a liquid hydrocarbon or a gas. Examples of suitable liquid hydrocarbons are isobutane and n-pentane. Examples of suitable gases are nitrogen or argon mixed with the gaseous monomer, or the undiluted gaseous monomer. Processes of this type are described in, for example, U.K. published patent specification Nos. 790,195; 704,641; 853,414; 886,784 and 899,156. It is also known to modify such catalysts with a titanium compound, for example, to render the catalyst capable of producing polyolefins having increased melt index (i.e., lower average molecular weight) or to increase the stress crack resistance of the produced polyolefin. Catalysts of this type are described in, for example, U.S. Pat. No. 3,622,521 to Hogan et al and U.K. published patent specification Nos. 1,334,662 and 1,326,167.

U.S. Pat. No. 3,351,623 to Walker et al discloses a catalyst for polymerizing ethylene at a temperature in the range of 275° F. to 335° F. under solution form process conditions, the catalyst being one which forms on mixing (1) an oxide component selected from the group consisting of silica; mixtures of silica and alumina containing up to 25 wt. % alumina; and mixtures of chromium oxide and at least one material selected from the group consisting of silica, alumina, zirconia and thoria, at least part of the chromium oxide being in the hexavalent state at the initial contacting of the monomer therewith, (2) an organo metallic component of formula $R_xM$ where R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminum, gallium, indium, thallium, zinc, boron, lead, lithium, zirconium, cobalt, magnesium and tin; and x is an integer equal to the valence of M, and (3) a vanadium component selected from the group consisting of vanadium chelates and vanadyl chelates. Walker et al seek to produce a catalyst that permits the use of high polymerization temperatures to obtain relatively low melt index polymer.

Downs, U.S. Pat. No. 4,368,302, discloses a modified alpha-olefin catalyst composition used in preparing polymers of ethylene or copolymers of ethylene and higher alpha-olefins, having a relatively broad molecular weight distribution, as evidenced by relatively high values of melt flow ratio (MFR), referred to by Downs as melt index ratio (MIR). The catalyst composition of Downs is prepared by supporting chromium oxide on a refractory oxide support material, adding at least one tetravalent titanium compound and heating to activate the product. The monomer is contacted with the active polymerization catalyst in the presence of one or more organometallic compounds, e.g., triethylaluminum. The refractory oxide support has a mean particle diameter of about 20–150 microns ($\mu$).

U.K. Patent Application No. 2,023,153 to Eve discloses an ethylene polymerization catalyst comprising: (A) a heat activated supported chromium oxide catalyst, and (B) a catalyst modifier comprising a magnesium compound, such as a dialkyl magnesium, preferably dibutyl magnesium, and a commercially available product believed to comprise a mixture of dibutyl magnesium, dialkyl magnesium and butyl-alkyl magnesium. The polymerization process, conducted in the presence of this catalyst, produces polyethylene or ethylene copolymers having broad molecular weight distribution and low melt index. The quantity of the catalyst modifier is such that the atomic ratio of magnesium to chromium in the modified catalyst system is 0.01:1 to 100:1, preferably 0.01:1 to 10:1.

Stricklen et al., U.S. Pat. No. 4,374,234, disclose a silica-supported chromium catalyst to which is added up to 5 ppm of an aluminumalkyl or dihydrocarbomagnesium compound in order to reduce the induction period and increase catalyst activity. The addition of the aluminum or the magnesium compounds has only a modest effect on polymer properties.

When polymers of ethylene or copolymers of ethylene and of one or more $C_3$–$C_{10}$ alpha-olefin useful for the blow-molding applications, e.g., for the household and industrial containers (HIC) market, are produced using the above-identified prior art catalysts in a fluid bed reactor, the reaction must either be conducted at relatively high temperatures of about 108°–110° C., approaching melting or sintering temperatures of the product resin, or with a relatively high level of oxygen intentionally added to the reactor (oxygen add-back) to produce a resin having the desired high load melt index (HLMI).

The operation of fluid bed reactor at the high temperature requires very elaborate control apparatus to prevent fusion of the resin particles, particularly the small size resin particles (fines), e.g., particles of the size less than 74 microns in the reactor, and particularly downstream of the reactor, e.g., in the recycle compressor. Since a typical resin produced with such a catalyst begins to melt and agglomerate at about 113° C., even minute temperature excursions above the reactor operating temperature can cause severe fines agglomeration, referred to in the art as fouling, in the process equipment downstream of the reactor, e.g., compressor and heat exchangers, due to melting and fusion of the fines.

As is known to those skilled in the art, the fluid bed alpha-olefin polymerization reactor system utilizes a recirculation compressor to recycle the fluidizing gas and unreacted monomers, if any, to the fluid bed reactor. The recycled fluidizing gas also contains at least some entrained polymer particles. The system also utilizes heat exchangers, usually located downstream of the compressor, to remove substantial amounts of exothermic heat generated during the reaction (e.g., see Goeke et al, U.S. Pat. No. 4,302,565). The compressor inherently increases the temperature of the gas stream compressed therein. Since the temperature gradient between the fluid bed reactor operating temperature and the melting temperature of the resin is very small (e.g., about 7°-9° C.), even a small elevation of the temperature of the fluidizing gas may cause fusion and agglomeration of the polymer particles in the compressor. If the temperature of the recycle gas is increased to the level wherein the fusion of the polymer particles takes place, the polymer particles will also tend to fuse and agglomerate in the heat exchangers and on the distribution plate of the reactor utilized to provide a uniform fluidized bed of particles therein.

The danger of polymer particles' fusion is exacerbated by the presence of catalyst in the polymer particles. As is known to those skilled in the art, the product polymer particles, also referred to herein as resin particles, produced in the polymerization reactor system, contain minute amounts of the catalyst particles which are not removed therefrom because the content thereof in the resin is so small as to render the removal of the catalyst particles unnecessary. The catalyst is inactivated when the resin is removed from the reactor. However, the resin in the reactor system contains catalytically-active catalyst particles. These catalytically active catalyst particles continue to promote the alpha-olefin polymerization reaction which is exothermic in nature, thereby producing additional amounts of heat. This heat, together with the inherent increase of the recycle gas temperature in the recycle compressor, combines to dangerously decrease the safety temperature margin between the reactor operating temperature and the resin fusion temperature. The polymer particles most susceptible to fusion are polymer fines. If fusion and agglomeration of polymer particles, particularly polymer fines, takes place in the recycle compressor, heat exchangers, on the distribution plate and/or any other parts of the polymerization system, the process efficiency is substantially decreased, and, ultimately, the fluidized bed system may have to be shut down to remove the fused polymer particles.

As mentioned above, the HLMI of the resin may also be increased by increasing the amount of oxygen added to the reactor, e.g., see Dalig et al. *KHIMIYA I TEKNOLOGIYA POLYMEROV*, Vol. 23, No. 4 (1961), Ermakov et al, "Transfer Processes During Polymerization of Ethylene on a Chromium Oxide Catalyst. II. The Role of Impurities In Transfer Reactions", *KINETICS AND CATALYSIS (USSR)*, Vol 10, No. 333 (1969). However, the increased oxygen content in the reactor may promote the formation of polymer fines, which are most likely to fuse in the reactor system. The alpha-olefin fluidized bed reactors, unlike fluidized bed reactors used in different chemical processes, e.g., fluid catalytic cracking, do not usually utilize fines removing equipment, such as cyclones or filters, because it is feared that such equipment may provide additional sites for fines to fuse and agglomerate. Thus, any polymer fines produced in the polymerization system tend to remain in the reactor loop. Accordingly, the use of relatively high amounts of oxygen to obtain resins of a desired HLMI may also lead to the fouling of the process equipment, such as compressor and heat exchangers, and, ultimately, to the shut-down of the reactor system.

A catalyst composition capable of producing alpha-olefin polymer resins at a relatively low polymerization temperature and at relatively low levels of oxygen is disclosed in a co-pending patent application of Hsieh et al, Ser. No. 339,955, filed on Apr. 18, 1989, now abandoned, the entire contents of which are incorporated herein by reference. That catalyst composition comprises a chromium compound and a tetravalent titanium compound supported on a refractory oxide support. The catalyst particles are substantially non-spherical and irregular in shape and they have a relatively broad particle size distribution range. The support has narrow pore size distribution i.e., at least 75% of its pore volume is in the pores of about 200 to about 500 Angstrom diameter. The catalyst composition is synthesized with $CrO_3$ or any compound of chromium calcinable thereto; with at least one tetravalent titanium compound; and it is activated by heating the catalyst for at least about 10 hours at a temperature of at least about 800° C.

Hsieh, U.S. Pat. No. 4,801,572, discloses a modified chromium-based olefin polymerization composition comprising a chromium compound-containing catalyst with a modifier which is an oxide of an element of Group IIA of the periodic chart of the Elements, e.g., magnesium oxide, containing at least about 0.5% by weight of water which polymerizes alpha-olefins to polymers having higher HLMI values than unmodified catalysts.

Hsieh, U.S. Pat. No. 4,816,432, discloses a modified catalyst composition comprising a chromium compound-containing catalyst and a modifier of the formula $RMgR'$, where R and R' are the same or different $C_1-C_{12}$ hydrocarbyl, alkoxy, alkenoxy or aryloxy groups, e.g., dibutylmagnesium. The modified catalyst composition has the molar ratio of magnesium to chromium of about 0.2 to about 1.25.

We now found that chromium-containing catalyst compositions can be modified to produce alpha-olefin resins having high HLMI at temperatures and at added oxygen levels lower than those possible with previously-available catalyst compositions.

Accordingly, it is a primary object of this invention to provide an improved polymerization catalyst which produces polymers of HLMI suitable for the blow molding applications at substantially lower operating temperatures than was heretofore possible with other similar catalysts.

It is an additional object of the present invention to provide an alpha-olefin polymerization process which produces polymer resins of ethylene and/or $C_3-C_{10}$ alpha-olefins, having such an HLMI that they are suitable for the blow molding applications, at lower temperatures than was heretofore possible with prior art catalysts.

Additional objects of the invention will be apparent to those skilled in the art from the following specification and the claims.

SUMMARY OF THE INVENTION

A modified alpha-olefin polymerization catalyst composition, also referred to herein as a catalytic complex, is obtained by combining a chromium compound-containing catalyst, supported on a suitable support, with a catalyst modifier which is an oxide of an element of Group IIIA of the Periodic Table of the Elements, published by CRC Press, Inc. in Handbook of Chemistry and Physics, 65th edition, 1984–85, containing a small quantity of water. The amount of water in the modifier is such that the resulting modified catalyst composition (i.e., the mixture of the catalyst and the modifier) contains about 0.010 to about 0.3% by weight (% wt.) of water. Preferably, the modifier has the particle size distribution range compatible with that of the catalyst composition. The modified catalyst composition is used to polymerize at least one $C_2$–$C_{10}$ alpha-olefin to form resins having higher HLMI values than those produced with the catalyst composition devoid of the modifier. The resins having high HLMI values can be prepared with the catalyst composition of the invention even without oxygen intentionally added to the polymerization reactor.

DETAILED DESCRIPTION OF THE INVENTION

The modified catalyst composition is prepared by combining the modifier with any supported chromium compound-containing alpha-olefin polymerization catalyst in any suitable manner. Suitable catalysts of this type are supported chromium catalysts disclosed, for example, by Hogan et al, U.S. Pat. No. 3,622,521, Levine et al, U.S. Pat. No. 4,011,382, and Hogan et al, U.S. Pat. No. 2,825,721, the entire contents of all of which are incorporated by reference herein. Hsieh, U.S. Pat. Nos. 4,801,572 and 4,816,432, the contents of which are incorporated herein by reference, disclose modified chromium-compound containing catalysts. The chromium-compound containing catalysts of both of these Hsieh patents, without the respective modifiers of the Hsieh patents, can also be used in this invention. The chromium compound is $CrO_3$ or any compound of chromium calcinable to $CrO_3$ under the catalyst activation conditions. Suitable chromium compounds include chromium nitrate, chromium carbonate, chromium acetate, ammonium chromate, chromium fluoride, tertiary butyl chromate, chromium acetylacetonate and chromium sulphate. Water-soluble compounds of chromium, such as $CrO_3$, are the preferred compounds used to deposit the chromium compound on the refractory oxide support from a solution thereof. However, organic solvents-soluble chromium compounds may also be used.

The polymerization catalyst also preferably contains at least one titanium compound. The titanium compound or compounds which may be used include all titanium compounds which are oxidizable to $TiO_2$ under the activation conditions employed, and include those disclosed in U.S. Pat. No. 3,622,521, Netherlands Patent Application No. 72-10881 (the disclosures of both of which are incorporated herein by reference) and Hsieh, U.S. Pat. Nos. 4,801,572 and 4,816,432. These compounds include those having the structures:

$(R_1)_n Ti(OR_1)_m$, $(R_2O)_m Ti(OR_1)_n$,
$(R_1)_n TiX_m$, $(RO)_n TiX_m$ and $TiX_4$ where m is 1, 2, 3 or 4, n is 0, 1, 2 or 3 and $m+n=4$; $R_1$ is a $C_1$ to $C_{12}$ alkyl, aryl or cycloalkyl group, and combinations thereof, such as aralkyl and alkaryl groups, $R_2$ is $R_1$, a cyclopentadienyl group, $C_2$ to $C_{12}$ alkenyl groups, such as ethenyl, propenyl, isopropenyl or butenyl, and X is chlorine, bromine, fluorine or iodine.

The titanium compounds thus include titanium tetrachloride, titanium tetraisopropoxide and titanium tetrabutoxide. The titanium compounds are conveniently deposited on the support from a hydrocarbon solvent solution thereof.

The amount of chromium and titanium compounds on the catalyst will depend on a particular catalyst used in a particular process.

The modifier may be blended with the catalyst outside of the polymerization reactor after both, the catalyst and the modifier, are separately prepared by their respective processes. Alternatively, the catalyst modifier may be introduced into the polymerization reactor while the catalyst is introduced separately into the polymerization reactor. However, in a preferred embodiment, the catalyst modifier is blended with the catalyst outside of the polymerization reactor and the thus-produced modified catalyst composition is then used in the polymerization reactor. It is important that the modifier and the modified catalyst composition contain at least some water in the form of moisture. The modifier must contain such an amount of water so that the modified catalyst composition contains about 0.010 to about 0.3, preferably about 0.015 to about 0.3%, more preferably about 0.015 to about 0.2% and most preferably about 0.2% wt. water. The water may be incorporated into the modifier by any convenient means, such as by exposing the modifier for a sufficient period of time to ambient atmosphere to produce the modifier containing such amounts of water that the modified catalyst composition will contain the aforementioned amounts of water, contacting the modifier with a moisture-containing gaseous stream or with liquid water, by drying the modifier to remove excess water, or by any other convenient means. Preferably, the modifier containing the correct amount of water is obtained by drying the modifier in a nitrogen atmosphere at about 80° to about 110° C. for about 10 to about 20 hours. It is also important that the particle size distribution range of the modifier be compatible with that of the catalyst with which it is combined but it need not be identical thereto. The term "compatible" is used herein to designate such a particle size distribution which enables the modifier to be readily blended with the catalyst. The amount of the catalyst modifier is about 1 to about 15, preferably about 3 to about 9 and most preferably about 5 to about 7% by weight based on the total weight of the mixture of the catalyst and the modifier. Suitable catalyst modifiers are boron oxide, aluminum oxide, gallium oxide, indium oxide or thallium oxide, preferably boron or aluminum oxide, and most preferably aluminum oxide. It is also possible to use a mixture of the aforementioned catalyst modifiers so long as the total amount of the sum of all of the modifiers is within the aforementioned weight percentage amounts. In a preferred embodiment, however, only one catalyst modifier is used to obtain the modified catalyst composition of the present invention.

MOST PREFERRED EMBODIMENT

In the most preferred embodiment, the modified catalyst composition of the present invention is prepared with the catalyst of Hsieh et al, described and claimed in a co-pending patent application, Ser. No. 339,955, field on Apr. 18, 1989, now abandoned, (hereinafter referred to as "the catalyst of Hsieh et al"). Accordingly, for the purposes of simplification and exemplification, the invention will now be described in conjunction with the most preferred embodiment of the invention. However, it will be apparent to those skilled in the art that the invention is not limited to this preferred embodiment since the modified catalyst composition of the invention can be prepared with any chromium-containing alpha-olefin polymerization catalyst (i.e., any "Phillips catalyst").

The catalyst of Hsieh et al is prepared in a process comprising the steps of:

1. drying or dehydrating the refractory oxide support material at a temperature of about 100° to about 500° C., preferably about 150° to about 300° C., and most preferably at about 200° C. for at least about 5 hours (hrs), preferably at least about 6 hours, and most preferably for about 16 hrs in a nitrogen atmosphere;

2. if required, depositing a chromium compound onto the dried support and drying the chromium-containing support at 200° C. for at least about 14 hours;

3. contacting the thus-obtained catalyst intermediate with at least one tetravalent titanium compound; and 4. purging the flammable components with nitrogen, preferably at about 325° C., and subsequently thermally activating the resulting solid, in an air atmosphere, at a temperature of at least about 800° C., preferably at least about 820° C., more preferably at about 820° to about 870° C., and most preferably at about 825° C. for at least about 10 hrs; preferably at least about 14 hrs, more preferably for at least about 16 hrs, and most preferably for about 16 hrs, to obtain an active catalyst composition.

In a preferred embodiment of the Hsieh et al catalyst synthesis, the refractory oxide support is obtained from a manufacturer with the chromium compound already deposited thereon, prior to the drying or dehydration step 1. Thus, in such an embodiment, step 2., above, is omitted.

The refractory oxide support material used to synthesize the Hsieh et al catalyst can be any Phillips catalyst support known in the art, such as silica, silica-alumina, silica-titania, alumina, zirconia or thoria, so long as it produces catalyst particles which are of such a size that the catalyst of Hsieh et al has a relatively broad particle size distributor range, i.e., diameter of the catalyst particles of Hsieh et al's catalyst is about 5 to about 250$\mu$ and more preferably about 45 to about 180$\mu$, preferably about 10 to about 200$\mu$, as determined by Scanning Electron Microscopy (SEM). The majority of the particles of the Hsieh et al catalyst must have relatively large particle diameters. Thus, the catalyst has a median particle diameter of about 50 to about 100, preferably about 60 to about 80 and most preferably about 75$\mu$, as determined by volume distribution using a HIAC-ROYCO PA-720 particle size analyzer. The catalyst of Hsieh et al also is preferably supported on a silica support which has a chromium compound (CrO$_3$) already impregnated on it and has a relatively narrow pore size distribution, i.e., the mid-height width of the differential plot dV/dr as a function of r, where V is pore volume and r is radius of the support, is about 12 to about 38 mm, preferably about 15 to about 35 mm, and most preferably about 16 to about 35 mm. This silica support has an average pore radius of about 120 to about 142 Angstroms (A). Such a silica is the most preferred refractory oxide support material used for the Hsieh et al catalyst synthesis, it contains about 0.18% by weight of chromium trioxide (CrO$_3$), and has about 88% of its pore volume in the pores of about 250 to about 450 Angstrom diameter, and particle diameter of about 10 to about 200 microns; it is available commercially from Joseph Crosfield & Sons Ltd., Applied Silicas Division, Warrington, England, under the tradename of SD-186.

The chromium compound and the tetravalent titanium compound are usually deposited on the support from the solutions thereof and in such quantities as to provide, after the activation step, the desired levels of chromium (Cr) and titanium (Ti) in the catalyst. The order of addition of the chromium and the titanium compounds to the support is not critical, provided that such compounds are added before the activation of the catalyst and provided that the support is dried before the titanium compound is added thereto. However, it is preferred to deposit the chromium compound onto the support before the titanium compound.

The chromium compound is CrO$_3$ or any compound of chromium which is calcinable thereto under the activation conditions employed during the Hsieh et al catalyst synthesis. At least a portion of the chromium in the supported, activated catalyst must be in the hexavalent state. Chromium compounds, other than CrO$_3$, which may be used are those disclosed above as being suitable for the preparation of the chromium compound-containing alpha-olefin polymerization catalysts, such as those disclosed in Hogan et al., U.S. Pat. Nos. 2,825,721 and 3,622,521, and include chromium nitrate, chromium carbonate, chromium acetate, ammonium chromate, chromium chloride, chromium fluoride, tertiary butyl chromate, chromium acetylacetonate, and chromium sulphate.

Water soluble compounds of chromium, such as CrO$_3$, are the preferred chromium compounds used in the Hsieh et al catalyst synthesis. However, organic solvents-soluble chromium compounds may also be used.

After the chromium compound is deposited on the support, the chromium compound-containing support is dehydrated or dried at the aforementioned conditions.

Subsequently, the dehydrated catalyst intermediate is contacted with a titanium compound or compounds. Suitable titanium compounds which may be used are also those disclosed above as being suitable for the preparation of the chromium and titanium compound-containing olefin polymerization catalysts.

The most preferred titanium compound is tetraisopropyltitanate. The amount of the titanium compound used is such that there is an excess of the moles of titanium (calculated as elemental titanium) with respect to the moles of chromium (calculated as elemental chromium) in the catalyst composition. Thus, the titanium (calculated as elemental titanium) is present in the final catalyst product, with respect to the chromium (calculated as elemental chromium), in a molar ratio of about 0.5 to about 180, and preferably about 4 to about 35.

After the titanium compound is deposited on the catalyst, the resulting solid material is activated at the aforementioned conditions.

The activated supported catalyst of Hsieh et al contains, based on the combined weight of the support and the chromium and titanium therein, about 0.05 to about 3.0, preferably about 0.10 to about 0.25, more preferably about 0.13 to about 0.18 and most preferably about 0.15 to about 0.18 weight percent of chromium (calculated as elemental chromium), and about 1.5 to about 9.0, preferably about 3.0 to about 7.0 and most preferably about 3.7 to about 6.0 weight percent of titanium (calculated as elemental titanium).

The resulting activated catalyst is then combined with the modifier and the resulting modified catalyst composition, when used, preferably in the presence of small amounts of hydrogen, to polymerize alpha-olefins is extremely effective in preparing alpha-olefin polymers suitable for blow-molding applications, such as for the HIC market, i.e., alpha-olefin polymers having relatively low die swell characteristics which render them suitable for the preparation of household and industrial containers, e.g., household cleaners bottles and possibly even products requiring higher HLMI values, such as milk bottles. Since it is preferred that the particle size distribution of the modifier be compatible with that of the catalyst composition, the modifier combined with the Hsieh et al catalyst composition has the particle diameter of about 10 to about 250, preferably about 10 to about 200, and most preferably about 45 to about 180 microns.

The modified catalyst composition is used to polymerize either ethylene alone or ethylene in conjunction with higher monomers, such as any one of $C_3$-$C_{10}$ alpha-olefins, e.g., 1-butene, 1-pentene, 1-hexene, 4-methyl-1-pentene, 1-heptene or 1-octene, preferably 1-butene, 1-pentene, 1-hexene or 4-methyl-1-pentene and most preferably 1-hexene. The polymerization reaction is preferably carried out in a fluid bed reactor and substantially in the absence of catalyst poisons, such as moisture, carbon monoxide and acetylene, with a catalytically effective amount of the modified catalyst composition at a temperature and pressure conditions sufficient to initiate the polymerization reaction.

In order to achieve density ranges of about 0.915 to about 0.965 g/cc in the copolymers, which includes the range of about 0.947 to about 0.959 g/cc required for HIC applications, it is necessary to copolymerize enough of the $C_3$ or higher comonomers with ethylene to achieve a level of about 0.1 to about 25 mole percent of the $C_3$ to $C_{10}$ comonomer in the copolymer. The amount of comonomer needed to achieve this result will depend on the particular comonomer(s) being employed. Further, the various intended comonomers have different reactivity rates, relative to the reactivity rate of ethylene, with respect to the copolymerization thereof with the catalysts of the present invention. Therefore, the amount of comonomer used in the stream of monomers fed to the reactor will also vary depending on the reactivity of the comonomer.

In the most preferred embodiment, the modified catalyst composition of the present invention is used to copolymerize 1-hexene and ethylene in a fluid bed process to obtain polymers having the density of about 0.947 to about 0.959 g/cc, which are especially suitable for HIC applications.

It is believed that the modified catalyst composition of this invention may be especially suitable for producing polymers of $C_2$-$C_{10}$ alpha-olefins in a gas phase, fluid bed reactor in the presence of about 0 to about 0.35 ppmw of oxygen, calculated on the basis of ethylene feed because it makes possible the operation of the reactor at a temperature not higher than about 108° C., preferably not higher than about 105° C., to produce polymer resins having HLMI values of about 25 to about 60, preferably about 30 to about 50, and most preferably about 40 to about 50. As is known to those skilled in the art, heretofore-known Phillips catalysts required gas phase fluid bed reactor temperatures of about 108° C.-110° C. to produce polymer resins having the aforementioned HLMI values. The resins must have these HLMI values to render them suitable for processing in blow-molding machines to produce products for the HIC market, such as bottles having high environmental stress crack resistance. Since the resins begin to fuse and agglomerate at about 113° C., the reactor operation at about 108°-110° C. may, and occasionally does, cause at least partial fusion of fine resin particles downstream of the fluidized bed reactor, e.g., in the compressor used to recirculate the reactor gases. In prior art, the HLMI of the resin was also increased by increasing the amount of oxygen or oxygen-containing gas (oxygen add-back), such as air, added to the gas phase, fluid bed reactor. While the reactor operation with the higher oxygen add-back increased the HLMI to the desired level, it also created additional quantities of resin fines which increased the risk of fouling of the process equipment, such as the gas recirculation compressor and heat exchangers.

It is believed that the modified catalyst composition of this invention will substantially decrease, if not completely eliminate, the danger of process equipment fouling because, at a given level of oxygen introduced into the reactor, it will enable the operation of the polymerization reaction at a substantially lower temperature, than was heretofore thought possible, to produce polymer resins having the aforementioned desired HLMI values. Thus, the safety margin between the reactor operating temperature and the resin fusion temperature will be increased, thereby reducing, if not substantially eliminating, the danger of equipment fouling by the fused (melted) resin particles. It is also notable that the modified catalyst composition of the invention is capable of producing polymer resins having the aforementioned HLMI values even in the substantial absence of added oxygen. This is especially surprising since the catalyst composition of Hsieh et al required added oxygen in most instances to produce resins of the required HLMI, as set forth in the aforementioned application of Hsieh et al.

An example of a fluidized bed reaction system which can be used in the practice of the process of the present invention is illustrated in Hsieh, U.S. Pat. Nos. 4,801,572 and 4,816,432.

It will be apparent to those skilled in the art that the modified catalyst composition of this invention may also be used to polymerize olefins, especially alpha-olefins, in any conventional polymerization reactor, e.g., slurry reactors.

Hydrogen may be used in the polymerization reaction of the present invention in such amounts that the ratio of hydrogen to ethylene is between about 0 to about 0.4 moles of hydrogen per mole of the ethylene monomer in the gas stream. Any gas inert to the catalyst and reactants can also be present in the gas stream.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| Density | ASTM D-1505 - A plaque is made and conditioned for one hour at 100° C. to approach equilibrium crystallinity. Measurement for density is then made in a density gradient column; reported as gms/cc. |
|---|---|
| Melt Index (MI), $I_2$ | ASTM D-1238 - Condition E - Measured at 190° C. - reported as grams per 10 minutes (g/10 min). |
| High Load Melt Index (HLMI), $I_{21}$ | ASTM D-1238 - Condition F - Measured at 10 times the weight used in the melt index test above, also reported as g/10 min. |

Melt Flow Ratio (MFR) = $\dfrac{I_{21}}{I_2}$

EXAMPLE 1

(Catalyst Synthesis)

A catalyst composition of Hsieh et al was prepared in the following multi-step procedure.

Step 1 (Drying)—A chromium oxide coated silica (0.18% wt. Cr, calculated as chromium trioxide) having an average pore radius of about 120 to about 142 A and mid-height width of the differential plot of dV/dr vs. r of about 16 to about 35 (Crosfield's SD-186 silica) was introduced into a fluid-bed drying vessel maintained under nitrogen ($N_2$) at an ambient temperature and pressure. The temperature of the vessel was increased at the rate of 25° C./hour until it reached about 210° C. The silica was dried in nitrogen atmosphere at about 210° C. for 16 hrs. It was then cooled to below 100° C. in 2-4 hrs.

Step 2 (Titanation)—271 kilograms (kg) of the product of Step 1 was charged to the catalyst mixing vessel along with 2300 liters of dry hexane. 114 kg of tetraisopropyltitanate was added at room temperature and the resulting brown slurry heated to 55° C. for 2 hrs. The hexane was removed with the jacket temperature set at 100° C. over the period of 24 hrs.

Step 3 (Activation)—Under good fluidization, the product of Step 2 was heated at 25° C./hr until it reached the temperature of 200° C. and it was held at that temperature for 2 hours. It was then heated at 315° C. for 3 hours in nitrogen; the nitrogen atmosphere was changed to air and held at 315° C. for one more hour; the temperature was increased from 315° C. to 845° C. at 100° C./hr; and, it was heated for 16 hrs at 845° C. in dry air. The temperature was then decreased to 150° C. as fast as possible. At 150° C., the air was again changed to nitrogen, and the temperature was decreased to ambient as fast as possible. The nitrogen purge was maintained for 1 hour at ambient temperature. The product was a yellow-orange catalyst which was analyzed by X-ray Fluorescent Analysis to contain:
Cr=0.14% wt.
Ti=3.3% wt.

EXAMPLE 2

(Preparation of the Modified Catalyst of the Invention)

0.95 grams of the catalyst of Example 1 was dry-blended with 0.05 grams (g) of aluminum oxide ($Al_2O_3$), obtained from Kaiser Aluminum Company which was a pseudo-boehmite, α-alumina mono-hydrate designated substrate alumina, SA. The alumina had been dried, prior to blending, at 90° C. for about 16 hours in a flowing, purified nitrogen stream. The resulting mixture of the alumina and the catalyst of Example 1 contained about 0.19% wt. of water. The water content was calculated from measured weight loss by thermogravimetric analysis (TGA), of modifier under $N_2$ purge, with temperature increased 20° C./min to 100° C., and held at 100° C. until no further weight loss was observed.

EXAMPLE 3

($Al_2O_3$-Containing Modified Catalyst)

One additional sample of the modified catalyst was prepared in the manner substantially similar to that of Example 2, except that the alumina used was a pseudo-boehmite, α-alumina monohydrate, obtained from Conoco, designated Catapal, and the mixture of the Catapal alumina and the catalyst of Example 1 contained 0.19% wt. of water.

EXAMPLE 4

(Polymerization of Ethylene With 1-Hexene in the Presence of the Modified Catalyst)

The modified catalyst composition of Example 2 was transferred to a one gallon slurry reactor filled with 2 liters of isobutane. The reactor was then heated to 97° C. 20 psia of ethylene and 5 ml of 1-hexene were fed to the reactor. Immediately thereafter, ethylene was introduced into the reactor to provide ethylene partial pressure in the reactor of 125 psia. The polymerization was carried out for about 1 hour at 125 psia ethylene pressure and at a temperature of 97° C. 320 grams (g) of the polymer product having density of 0.952 g/cc, $I_2$ of 0.127, $I_{21}$ of 23.1, and MFR of 183 was obtained.

EXAMPLE 5

(Polymerization of Ethylene With 1-Hexene in the Presence of the Modified Catalyst)

Ethylene was copolymerized with 1-hexene substantially in the manner of Example 4 in the presence of the modified catalyst composition of Example 3. The polymerization process yielded 277 g of a polymer having density of 0.952 g/cc, $I_2$ of 0.177 g/10 min, $I_{21}$ of 24.0 and MFR of 136.

EXAMPLE 6 (Comparative)

(Polymerization of Ethylene With 1-Hexene With Catalyst of Example 1)

Ethylene was copolymerized with 1-hexene, substantially in the manner of Example 4 but in the presence of 1 g of the catalyst of Example 1, i.e., with the catalyst of Hsieh et al. devoid of the alumina modifier. The polymerization yielded 723 g of a polymer having a density of 0.949 g/cc, $I_2$ of 0.018 g/10 min, $I_{21}$ of 5.3 and MFR of 294.

EXAMPLE 7 (Comparative)

(Polymerization of Ethylene With 1-Hexene With Catalyst Modified With Undried Alumina)

0.95 g of the catalyst of Example 1 was blended with 0.05 g of Kaiser alumina which was not dried in accordance with the procedure of Example 2. The resulting blend, containing 0.47% wt. of water, was used to polymerize ethylene with 1-hexene substantially in the manner of Example 4. No polymer was produced.

EXAMPLE 8 (Comparative)

(Polymerization of Ethylene With 1-Hexene With Catalyst Modified With Silica)

0.925 g of the catalyst of Example 1 was blended with 0.075 g of Crosfield EP-10 silica, which had not been dried. The resulting blend, containing 0.40% wt of water, was used to polymerize ethylene with 1-hexene substantially in the manner of Example 4. No polymer was produced.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A modified olefin polymerization catalyst composition comprising a mixture of a supported catalyst comprising a chromium compound and a catalyst modifier which is an oxide of an element of Group IIIA of the Periodic Table of the Elements, the modifier containing such an amount of water that the modified catalyst composition contains about 0.010 to about 0.3% wt. of water.

2. A modified catalyst composition of claim 1 which contains about 0.015 to about 0.3% wt. of water.

3. A modified catalyst composition of claim 2 wherein the supported catalyst additionally comprises a titanium compound.

4. A modified catalyst composition of claim 3 wherein the catalyst modifier is selected from the group consisting of boron oxide, aluminum oxide, gallium oxide, indium oxide and thallium oxide.

5. A modified catalyst composition of claim 4 wherein the catalyst modifier is selected from the group consisting of boron oxide and aluminum oxide.

6. A modified catalyst composition of claim 5 wherein the catalyst modifier is aluminum oxide.

7. A modified catalyst composition of claim 6 wherein the catalyst modifier has particle size distribution range compatible with that of the supported catalyst.

8. A modified catalyst composition of claim 7 wherein the supported catalyst has a relatively broad particle size distribution range.

9. A modified catalyst composition of claim 8 wherein the particle diameter of the catalyst modifier is about 5 to about 250$\mu$.

10. A modified catalyst composition of claim 9 wherein the particle diameter of the catalyst modifier is about 10 to about 200$\mu$.

11. A modified catalyst composition of claim 10 wherein the particle diameter of the catalyst modifier is about 45 to about 180$\mu$.

12. A modified catalyst composition of claim 11 containing about 1 to about 15% wt. of the catalyst modifier.

13. A modified catalyst composition of claim 12 containing about 3 to about 9% wt. of the catalyst modifier.

14. A modified catalyst composition of claim 13 containing about 5 to about 7% wt. of the catalyst modifier.

15. A modified catalyst composition of claim 14 wherein the supported catalyst has the particle diameter of about 5 to about 250$\mu$.

16. A modified catalyst composition of claim 15 wherein the supported catalyst has the particle diameter of about 10 to about 200$\mu$.

17. A modified catalyst composition of claim 16 wherein the supported catalyst is supported on a support having an average pore radius of about 120 to about 142 Angstroms, and a mid-height width of the differential curve of dV/dr as function of r, where V is pore volume of the support and r is radius of the support, is about 12 to about 38 mm.

18. A modified catalyst composition of claim 17 wherein the support has an average pore radius of about 120 to about 142 Angstroms and mid-height width of the differential curve of about 15 to about 35 mm.

19. A modified catalyst composition of claim 18 wherein the support has an average pore radius of about 120 to about 142 Angstroms and mid-height width of the differential curve of about 16 to about 35 mm.

20. A modified catalyst composition of claim 19 wherein the supported catalyst has a median particle diameter of about 50 to about 100$\mu$, as determined by volume distribution using HIAC-ROYCO PA-720 particle size analyzer.

21. A modified catalyst composition of claim 20 wherein the supported catalyst has a median particle diameter of about 60 to about 80$\mu$, as determined by volume distribution using HIAC-ROYCO PA-720 particle size analyzer.

22. A modified catalyst composition of claim 21 wherein the supported catalyst has a median particle diameter of about 75$\mu$, as determined by volume distribution using a HIAC-ROYCO PA-720 particle size analyzer.

23. A modified catalyst composition of claim 22 wherein the chromium compound is $CrO_3$ or any compound of chromium calcinable to $CrO_3$ under the supported catalyst activation conditions.

24. A modified catalyst composition of claim 23 wherein the supported catalyst is activated for at least about 10 hours at a temperature of at least about 800° C.

25. A modified catalyst composition of claim 24 wherein the supported catalyst contains about 0.05 to about 3.0% by weight of chromium, calculated as elemental chromium.

26. A modified catalyst composition of claim 25 wherein the supported catalyst contains about 0.10 to about 0.25% by weight of chromium, calculated as elemental chromium.

27. A modified catalyst composition of claim 26 wherein the supported catalyst contains about 0.13 to about 0.18% by weight of chromium, calculated as elemental chromium.

28. A modified catalyst composition of claim 27 wherein the supported catalyst contains about 0.15 to about 0.18% by weight of chromium, calculated as elemental chromium.

29. A modified catalyst composition of claim 28 wherein the support is silica containing 0.18% by weight of $CrO_3$.

30. A modified catalyst composition of claim 29 wherein, prior to the activation of the supported catalyst, the silica is dehydrated at a temperature of about 100° to about 500° C. for at least about 5 hours in a nitrogen atmosphere.

31. A modified catalyst composition of claim 30 wherein the silica is dehydrated at a temperature of about 150° to about 300° C. for at least about 6 hours.

32. A modified catalyst composition of claim 31 wherein the silica is dehydrated at a temperature of about 200° C. for about 16 hours.

33. A modified catalyst composition of claim 32 wherein, after the dehydration is completed, the titanium compound is deposited on the dehydrated silica.

34. A modified catalyst composition of claim 33 wherein, after the titanium compound deposition is completed, the supported catalyst is activated at a temperature of at least about 820° C. for at least about 16 hours.

35. A modified catalyst composition of claim 34 wherein the supported catalyst is activated at a temperature of about 820° to about 870° C.

36. A modified catalyst composition of claim 35 wherein the supported catalyst is activated at a temperature of about 845° C. for about 16 hours.

37. A method of preparing a modified polymerization catalyst composition comprising combining a supported catalyst, which comprises a chromium compound, with a catalyst modifier which is an oxide of an element of Group IIIA of the Periodic Table of the Elements, to obtain the modified catalyst composition containing about 0.010 to about 0.3% by weight of water.

38. A method of claim 37 wherein the catalyst modifier is selected from the group consisting of boron oxide, aluminum oxide, gallium oxide, indium oxide and thallium oxide.

39. A method of claim 38 wherein the catalyst modifier is selected from the group consisting of boron oxide and aluminum oxide.

40. A method of claim 39 wherein the catalyst modifier is aluminum oxide.

* * * * *